United States Patent [19]
Lawrence

[11] Patent Number: 5,954,535
[45] Date of Patent: Sep. 21, 1999

[54] QUICK RELEASE COMPACT FLUORESCENT LAMP CONNECTOR

[75] Inventor: Murray Lawrence, Kings Park, N.Y.

[73] Assignee: Aerospace Lighting Corporation, Holbrook, N.Y.

[21] Appl. No.: 09/000,774

[22] Filed: Dec. 30, 1997

[51] Int. Cl.[6] .................................................. H01R 4/24
[52] U.S. Cl. ......................................... 439/439; 439/835
[58] Field of Search .................................. 439/439, 441, 439/729, 835

[56] References Cited

U.S. PATENT DOCUMENTS

| | | | |
|---|---|---|---|
| Re. 30,277 | 5/1980 | Simmons | 339/74 R |
| 1,966,156 | 7/1934 | Witcher | 173/343 |
| 2,282,875 | 5/1942 | Mueller | 173/328 |
| 2,424,874 | 7/1947 | Beals | 173/328 |
| 2,436,706 | 2/1948 | Weritz | 173/328 |
| 2,449,736 | 9/1948 | Bogen | 173/328 |
| 2,499,507 | 3/1950 | Jordan | 173/328 |
| 2,569,662 | 10/1951 | Fallek | 173/328 |
| 2,663,851 | 12/1953 | Pistey | 339/50 |
| 3,135,488 | 6/1964 | Leonard | 248/50 |
| 3,252,677 | 5/1966 | Raymond | 248/68 |
| 3,267,275 | 8/1966 | Kendall et al. | 240/11.2 |
| 3,539,969 | 11/1970 | Johnson et al. | 339/52 |
| 3,851,295 | 11/1974 | Geier | 339/54 |
| 3,868,182 | 2/1975 | Kidd | 355/67 |
| 3,892,457 | 7/1975 | Detch et al. | 339/54 |
| 4,337,503 | 6/1982 | Turner | 362/72 |
| 4,713,019 | 12/1987 | Gaynor | 439/232 |
| 4,795,357 | 1/1989 | Kosmol et al. | 439/232 |
| 4,796,168 | 1/1989 | Petersen | 362/217 |
| 4,799,896 | 1/1989 | Gaynor et al. | 439/232 |
| 4,979,081 | 12/1990 | Leach et al. | 362/219 |
| 4,994,710 | 2/1991 | Roelevink et al. | 313/318 |
| 5,085,484 | 2/1992 | Kasubke | 248/62 |
| 5,145,392 | 9/1992 | Kemp | 439/232 |

FOREIGN PATENT DOCUMENTS

| | | | |
|---|---|---|---|
| 1261921 | 2/1968 | Germany | 439/439 |
| 726317 | 3/1955 | United Kingdom | 439/439 |

*Primary Examiner*—Kheim Nguyen
*Attorney, Agent, or Firm*—Frederick J. Dorchak

[57] ABSTRACT

A fluorescent lamp connector for releasable axial engagement with a bi-pin fluorescent lamp is disclosed. The connector comprises a first housing section, a second housing section adapted to be connected to at least a portion of the first housing section, a locking spring, and a release member adapted for axial movement within the first housing section. The locking spring comprises a plurality of pin-receiving apertures adapted to axially receive and grip the pins of the fluorescent lamp. A preferred embodiment has a wedge-shaped release member having at least two rails which guide the release member through channels in the first housing section and into the locking spring upon flexing of the second housing section. In operation, the second housing section is pressed radially to drive the release member axially against the locking spring and flex it. The change in the effective diameter or slot of the pin-receiving apertures of the locking spring upon flexing of the spring releases the pins from the locking spring simultaneously to allow the fluorescent lamp to be separated from the connector.

9 Claims, 4 Drawing Sheets

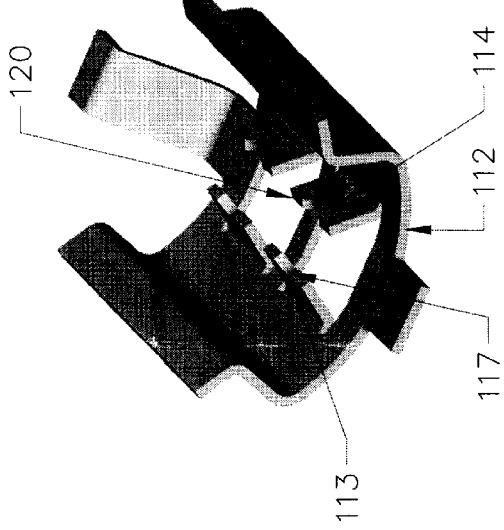
FIGURE 4A
FIGURE 4B
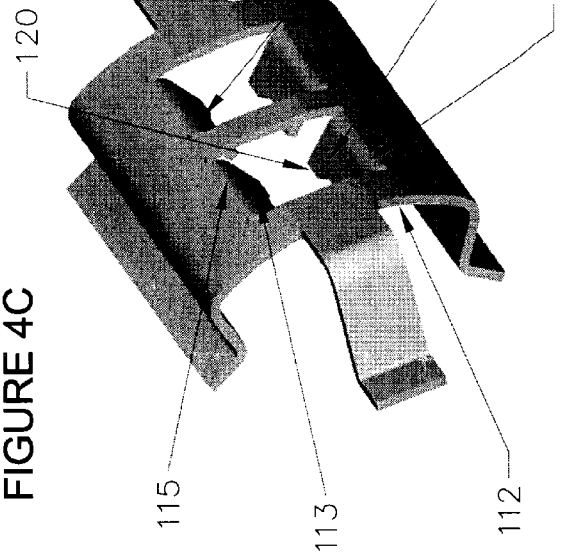
FIGURE 4C
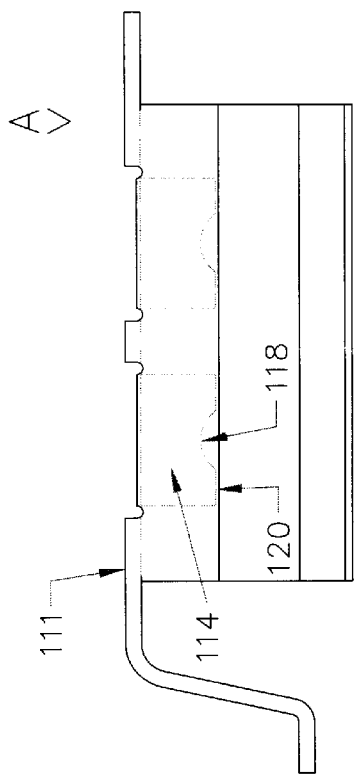
FIGURE 4D

QUICK RELEASE COMPACT FLUORESCENT LAMP CONNECTOR

CROSS REFERENCE TO RELATED APPLICATION

This application is related to pending patent application Ser. No. 08/729,731, filed Oct. 7, 1996 and assigned to the assignee of the present invention, the specification of which is incorporated herein by reference.

BACKGROUND OF THE INVENTION

The present invention relates to bi-pin fluorescent lamps and more particularly to a quick release compact connector for releasable axial engagement of such lamps in environments such as the passenger cabins of aircraft.

DESCRIPTION OF THE RELATED ART

It is known to provide latched sockets for fluorescent tubes whether in aircraft or other environments. For example, one type of latched socket having a plunger release mechanism is shown in U.S. Pat. No. 2,282,875 to Mueller wherein laterally inserted fluorescent tube pins are held against contacts which are movable into and out of the slots for the pins. A plunger slidably mounted in a groove moves the contacts out of the slots to release the pins. See also U.S. Pat. No. 3,851,295 to Geier.

In Kosmol et al U.S. Pat. No. 4,795,357, aircraft mounted fluorescent tube pins are laterally inserted downward in slots to displace latches on a movable latch plate. Once the pins have sealed, the latches cover the slots to retain the pins. A push button in a guide groove displatches the latches sideways to unblock the slots and release the pins.

The Kemp U.S. Pat. No. 5,145,392 shows a rather complex latch for fluorescent tubes in which latches on a spring-biased slide block the slots for the pins upon lateral insertion. A spring urges both the contacts and the pins against the latches to maintain electrical contact. Rotation of a lever moves the slide and latches to unblock the slots and release the pins.

The Beals U.S. Pat. No. 2,424,874 shows a pivoted lamp retainer having an indentation that savings into the bottom of a slot after the lamp pins have been inserted to stop the pins from falling out. The Pistay U.S. Pat. No. 2,663,851 also shows a pivot latch for a single pin lamp. See also U.S. Pat. No. 2,569,662 to Fallek in which rightward movement of a swing latch moves a spring-biased movable contact arm out of the slot so that both lamp pins can be inserted into the slot. Leftward movement of the swing latch allows the movable contact arm to slide below the lower lamp pin to prevent the pins from falling out of the slot.

The Roelevink et al. U.S. Pat. No. 4,994,710 shows an assembly for a low-pressure discharge lamp in which flexible tongues engage lamp cap pins; however, no latch or release mechanism is provided for.

Other patents of general interest are Simmons Reissue Pat. No. 30,277; Witcher U.S. Pat. No. 1,966,156; Weitz U.S. Pat. No. 2,436,706; Jordan U.S. Pat. No. 2,499,507; Bogen U.S. Pat. No. 2,449,736; Gaynor U.S. Pat. No. 4,713,019; and Gaynor et al. U.S. Pat. No. 4,799,896.

The Simmons patent mentioned above relates to an electrical tab receptacle having a lance to engage an aperture formed in a flat tab which is inserted into the receptacle. A deflectable member releases the lance from the aperture in the tab.

The Witcher patent relates to a plug having a spring-biased latch hook which engages a hook on a prong of the plug. A Y-shaped member sliding in a recess pushes the latch hook out of the way to release the prong.

The Bogen patent relates to a socket and prong member combination in which the lamp pins go into loops at one end of the contacts in a prong member body. The contacts have latch wings on the opposite end which engage socket ledges in the socket body. Pressing finger grips moves the wings off the ledges to allow for separation of the contacts from the socket body.

The remaining Weritz, Jordan, Gaynor, and Gaynor et al patents all relate to lamp sockets. The Gaynor and Gaynor et al patents relate to a socket for a double-tube fluorescent lamp. Weritz relates to a lamp socket in which the pins pass downwardly through vertical slots. By thumb screws a wedge is moved to press the contacts into the pins and hold them against the contacts. See also Jordan in which the pins slide up through a slot and are held below by V-shaped contacts. Depression of a plunger against a spring moves the contacts away and allows the pins to slide downward out of the slots.

It is also known to use a latch arrangement to secure the connection between male and female terminals in the wiring connecting fluorescent lamps to a power source. The latch rests on the top of the insulating cover having the male terminal or pin and secures the female terminal or socket from release by engaging a ridge on the insulating cover housing the female terminal. Depressing the latch releases the ridge and allows the female terminal to be disengaged from the male terminal.

Although at the present time there are a large variety of latched socket arrangements, there is still a need for a connector which is simple in construction and operation and which provides a locking and release mechanism suitable for use in an aircraft environment.

OBJECTIVES AND FEATURES OF THE INVENTION

It is an objective of the present invention to provide a quick release compact connector which permits releasable axial engagement of a bi-pin fluorescent lamp, so that it may be used, for example, in aircraft environments where a secure but easily releasable connection is needed.

It is a further objective of the present invention to provide such a connector which is simple and compact in construction and easy in operation and yet will provide a secure yet releasable electrical connection with a bi-pin fluorescent lamp so that potentially hazardous conditions such as electric arc can be avoided in the passenger cabin of an airplane.

It is further objective of the present invention to provide a quick release compact fluorescent lamp connector which offers significantly greater lighting system mounting flexibility than conventional connector designs and does not combine provisions for mechanically securing the lamp to a fixture or bulkhead with that of the electrical connection.

It is a further feature of the present invention to provide such a connector in which simple mechanical action engages and disengages the connector from the lamp while also securing the connector to the lamp during normal operation.

It is a further feature of the present invention to provide such a connector which may be used with a "T5" type of fluorescent lamp.

It is a further objective of the present invention to provide such a connector which permits activation of its release mechanism multiple times without degradation of its functionality.

It is a further objective of the present invention to provide such a connector which is not affected by vibration or heat and will maintain a mechanically secure electrical connection sufficient to power a fluorescent lamp until the release mechanism is operated.

It is a further objective of the present invention to provide such a connector which allows complete electrical isolation between the locking spring and the external environment.

It is a further objective of the present invention to provide such a connector which may be formed of inexpensive materials, and yet will provide a stable and releasable electrical connection.

It is a further objective of the present invention to provide such a connector that is significantly smaller and more compact than conventional designs and that increases the lighting system flexibility by virtue of its small size and easy installation.

It is a feature of the present invention to provide a fluorescent lamp connector for releasable axial engagement with a bi-pin fluorescent lamp. The connector has a locking spring comprising a plurality of pin-receiving apertures, each aperture adapted to axially receive and seize and a pin of the fluorescent lamp. For example, the locking spring may be formed as a unitary member having a first portion at least in part rectangular in shape, a flexible portion having a curved edge connected to the first portion, and a plurality of metal tabs, each being rectangular in shape and having a juncture line with the second portion. The juncture lines or folds of the metal tabs are parallel to each other. The tabs have a curved slot in the edge opposite to and parallel with the edge defining the juncture line with the flexible portion. The curved slots cooperate to form a pin-receiving aperture to axially seize the pin and the release it upon actuation of the release mechanism.

It is a further feature of the present invention to provide a wedge-shaped unitary release member. The release member has a first portion adapted to engage a portion of the locking spring against a first housing section. Preferably, the release member also has second and third portions rectangular in shape which act as guides for the release member within the first housing section when the first portion moves axially into the locking spring upon pressing of a second housing section and releases the fluorescent lamp pins from the spring simultaneously.

SUMMARY OF THE INVENTION

A fluorescent lamp connector is provided for releasable axial engagement with a bi-pin fluorescent lamp. The connector has a first housing section preferably forming a bridge or body of electrically insulating material such as injection molded plastic, a second housing section forming a clamshell lever, a locking spring, preferably formed from a copper alloy such as Beryllium Copper, and a wedge-shaped release member. The locking spring is electrically connected to a fluorescent lamp power source, for example, by an electrically conductive wire.

The first housing section has an open end and at least one wire-receiving recess through one of its surfaces. The second housing section is adapted to be connected to at least a portion of said first housing section. The locking spring is received within the open end of the first housing section. The locking spring comprises a plurality of pin-receiving apertures, each adapted to axially receive and seize a pin of the fluorescent lamp and release the pin upon flexing of the locking spring. The release member is adapted for axial movement within the first housing section upon flexing of the second housing section. The second housing section is configured to secure the release member and the locking spring within the first housing section, and the release member causes the locking spring to release the pins from the locking spring upon flexing of the second housing section. Flexing of the second housing section moves the first housing section axially into the locking spring and causes it to flex. The flexing of the locking spring operates to change the effective diameter of it pin-receiving apertures to release the pins from the locking spring simultaneously to allow the fluorescent lamp to be separated from the connector.

BRIEF DESCRIPTION OF THE DRAWINGS

Other objectives and features of the present invention will be apparent from the following description, taken in conjunction with the accompanying drawings. In the drawings:

FIG. 4A is a front elevation view of a locking spring incorporated in the connector of the present invention.

FIG. 4B is a side elevation view of the locking spring of FIG. 4A looking in the direction of arrow A in FIG. 4A.

FIG. 4C is a top isometric view of the locking spring of FIG. 4A.

FIG. 4D is a bottom isometric view of the locking spring of FIG. 4B.

DETAILED DESCRIPTION

The connector of the present invention preferably consists of five individual components: a clamshell lever, a wedge, a bridge, a spring, and a wire. The clamshell lever, wedge, and bridge are preferably formed by molding insulating material such as plastic. Preferably these parts are injection molded and employ a flame retardant plastic material that self-extinguishes upon removal of the heat source and does not outgas toxic elements at elevated temperatures. For example these parts may be fabricated with injection molded plastic such as valox 310 (flammability U.L.-94VO and UV stabilized), a polycarbonate material. The high dielectric plastic material provides electrical insulation between the metal locking spring and the external environment. The spring is preferably a Beryllium Copper alloy. The wedge and spring are housed within the bridge and held securely in place by the clamshell lever. The wire attaches to a tab on one surface of the spring and provides the electrical connection from the lamp pins to the exterior of the connector.

Figure 1:
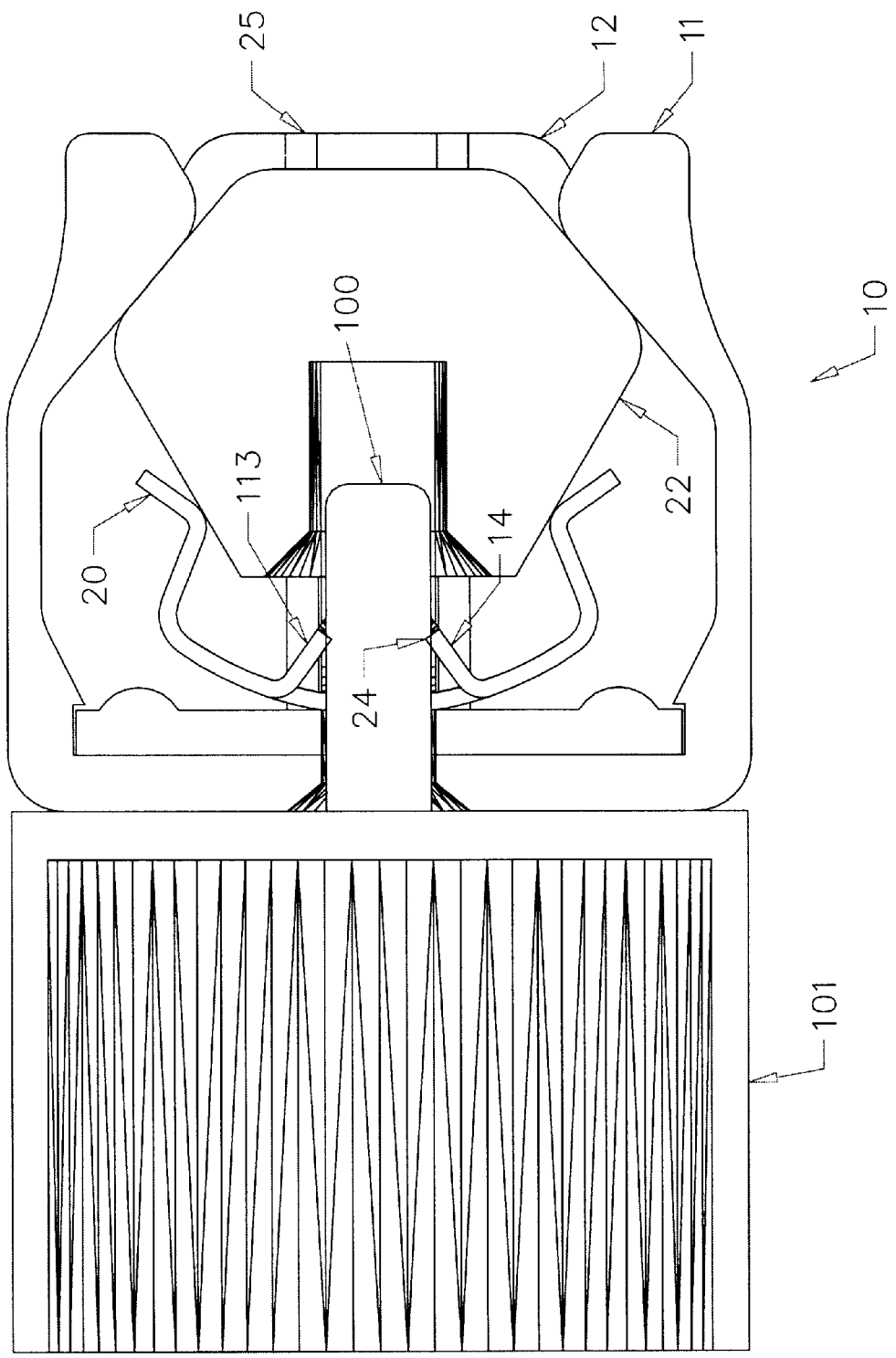
FIG. 1 is a general assembly view of an embodiment of the present invention.
Figure 2:
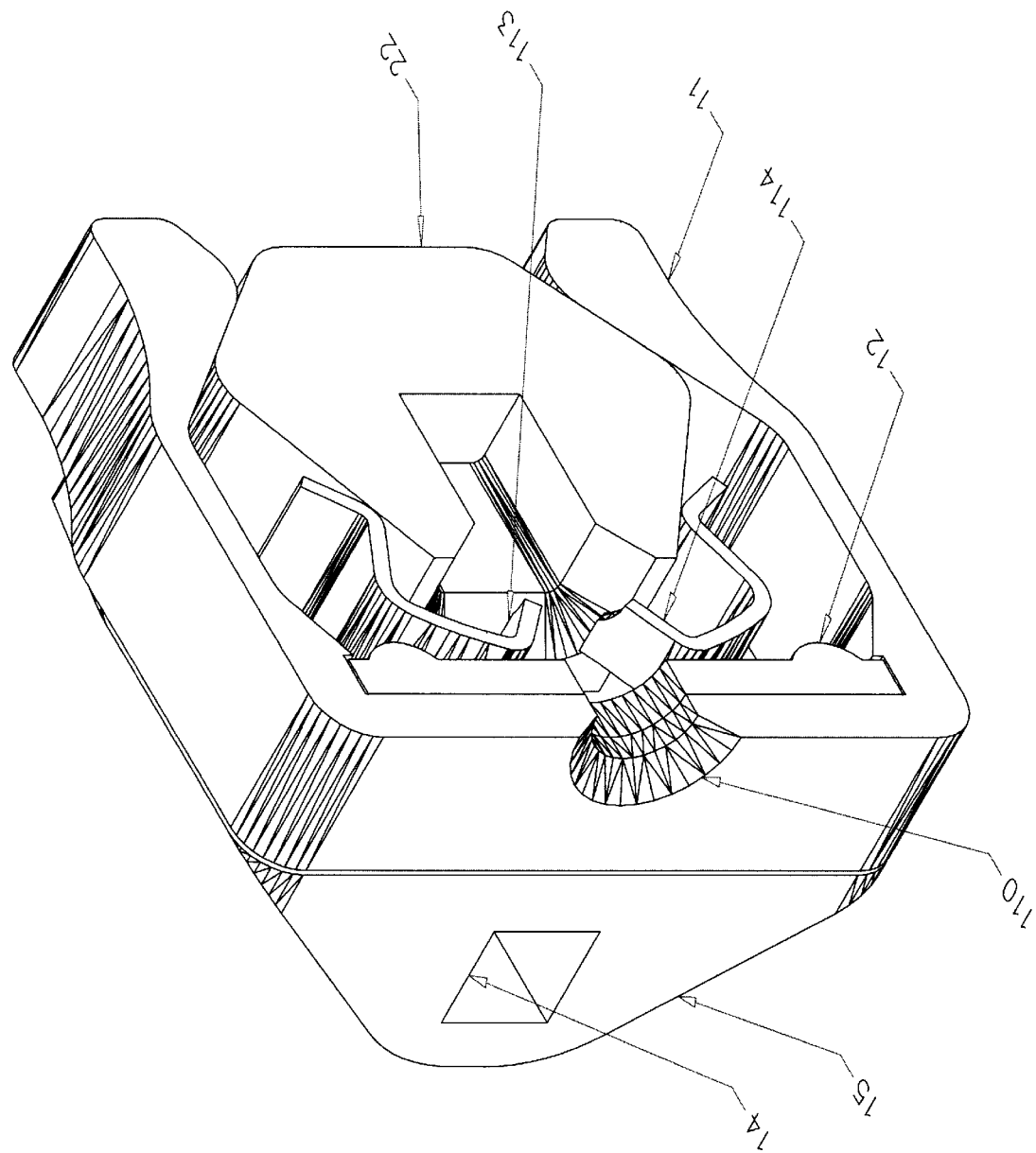
FIG. 2 is an elevation view of the embodiment shown in FIG. 1 partially broken away to show the interior of one of the pin receiving openings or cavities in each of the first and second housing sections.
Figure 3:
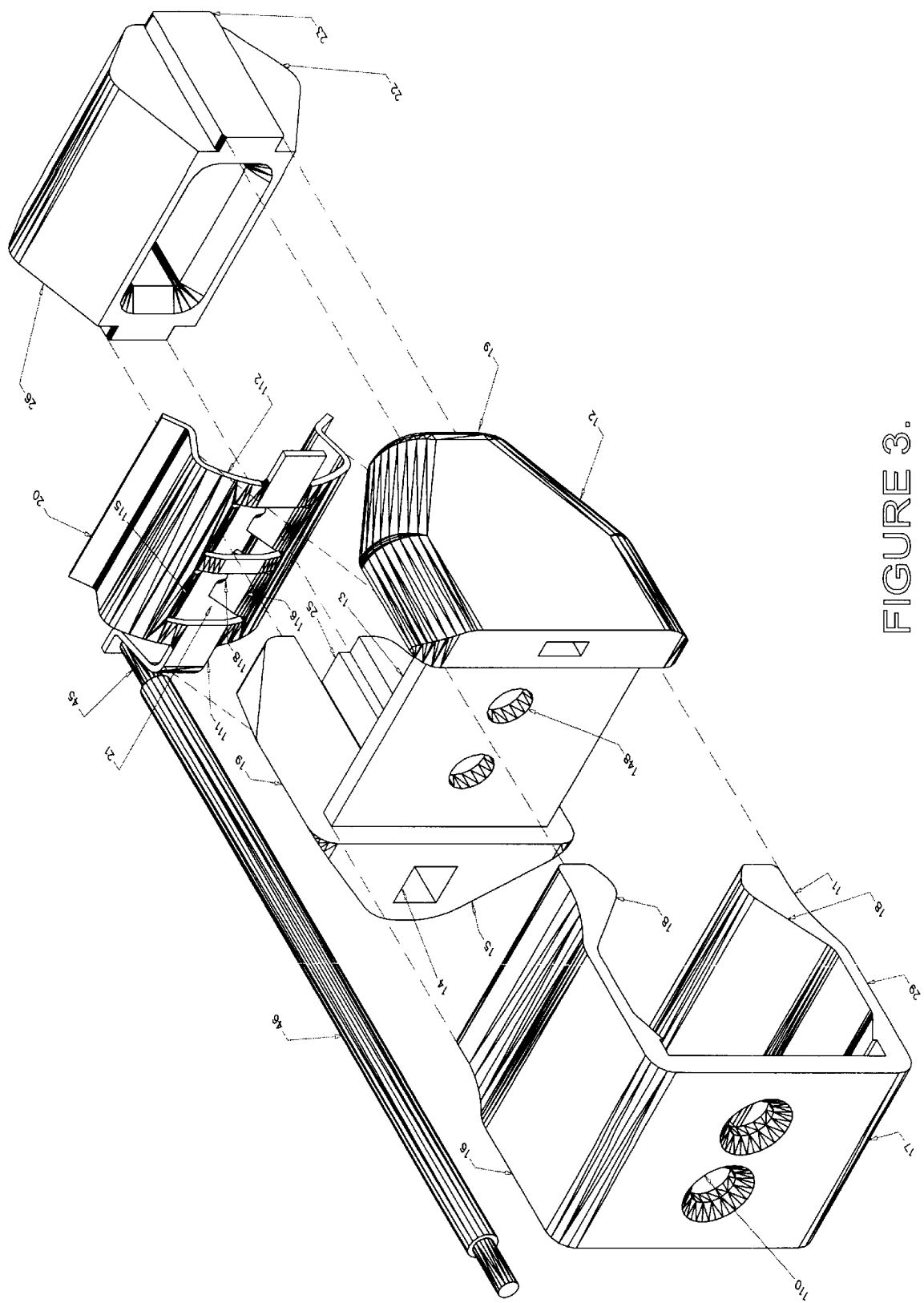
FIG. 3 is a top exploded view of the embodiment shown in FIG. 1 looking in the direction of arrow A in FIG. 1.

The connector 10 of a preferred embodiment is shown in FIGS. 1–3 and comprises a first housing section 12 and a second housing section. The second housing section 11 preferably comprising a clamshell lever fabricated with injection molded plastic, adapted to be connected to at least a portion of the first housing section, preferably by being snap-fitted to a back portion or surface of the first housing section without welding.

As shown in FIG. 3, the first housing section 12 preferably comprises a unitary body of insulating material such as injection molded plastic having an open end 13 and at least one wire-receiving recess 14, for example, 0.105 inches long and 0.105 inches wide, preferably through a surface 15 of the first housing section. However, those skilled in the art will recognize that other dimensions may be used depending on the particular lamp and wires used. Recess 14 also may extend through to side surface 19 of the first housing section 12.

The first housing section 12 has formed within its open end 13 at least one, preferably two, openings or cavities 148 for receipt of the pins of a bi-pin fluorescent lamp. Preferably this pair of circular openings 148 extend through the open end 13 of first housing section 12 as shown in FIG. 3. First housing section 12 also preferably has at least one, preferably two, channels 25 for receiving release member 22.

The second housing section 11 has a back portion 17 rectangular in shape and preferably two top and bottom or side portions 16 and 29 extending generally perpendicular to the back portion 17 and parallel to each other, and configured to secure release member 22 and locking spring 20 within first housing section 12. Back portion 17 also preferably has two pin-receiving openings 110 aligned with pin-receiving openings 148 of first housing section 12. Side portions 16 and 29 have inwardly sloping surfaces 18 transferring force to the release member 22 to release the fluorescent lamp, a direct result of inward force pressing or flexing side portions 16, 29. Sloping surfaces 18 and release member 22 are formed such that when second housing section 11 is pressed, release member 22 is moved axially into locking spring 22 to release the fluorescent tube pins from locking spring 20 simultaneously. Typical and preferred dimensions of the second housing section are height 0.65 inches; width 0.50 inches; length 0.60 inches, Other dimensions may be used depending on the specific requirements.

The connector also comprises a locking spring 20 received within open end 13 of the first housing section 12. Side surfaces 19 of the first housing section 12 may also serve to secure the locking spring 20 within open end 13 and electrically insulate the locking spring 20 from the external environment. Locking spring 20 is preferably a Beryllium Copper alloy or other electrically conductive metal. Locking spring 20 of formed tempered Beryllium Copper alloy will generally withstand repeated flexing and offer in excess of 100 insertion and removal cycles.

A plurality of pin-receiving apertures, preferably two, are provided in locking spring 20. The metal locking spring 20 provides both the electrical and mechanical connection to the lamp. A plurality of locking tabs 113, 114 of electrically conductive metal, preferably on either side of two openings or holes 21 in locking spring 20, grasp the lamp pins when the connector is attached to the lamp.

Locking tabs 113, 114 are electrically connected to a fluorescent lamp power source by an electrically conductive wire 45 which has an electrically insulated sheath 46. Wire 45 is attached to a tab 111 at the edge 112 of locking spring 20. The design of the cavity or openings 21 and the geometry of locking spring 20 causes the tabs 113, 114 which grip the lamp pins to part in response to forces applied by the release member 22, thereby releasing the locking grip.

As shown in FIGS. 1 and 3, each pin-receiving aperture 24 provided in locking spring 20 is adapted to axially receive and grip a pin of a fluorescent lamp, such as a "T5" type of fluorescent lamp. The cross portion 17 of the second housing section 11 has openings 110 aligned with each pin-receiving aperture 24 of the locking spring 20 to permit receipt of a fluorescent lamp pin.

The locking spring 20 is electrically connected to a fluorescent lamp power source by an electrically conductive lamp power wire 45. Preferably, locking spring 20 is welded to one electrically conductive lamp power wire for simplicity, flexibility and compactness. Wire 45 preferably extends through back surface 15 of first housing section 12. Preferably locking spring 20 is formed as a unitary member comprising a first portion 111 at least in part rectangular in shape, a flexible portion 112 having a curved edge connected to the first portion 111, and a plurality of locking tabs 113, 114.

First portion 111 is preferably formed with a fold or bend at a near right angle as shown in FIG. 3. First portion 111 is designed for electrical connection through an electrically conductive wire to a fluorescent lamp power source. Flexible portions 112 are preferably formed bending radially away from the plane of the first portion 111.

Metal tabs 113, 114 are each preferably rectangular in shape and each has a respective juncture line or fold 115, 116 with the flexible portion 112. As shown in FIGS. 4A–4D, metal tabs 113, 114 are preferably spaced apart on equal and opposite flexible portions 112 and are disposed at an angle of 55° with respect to the plane of first portions 111 as shown in FIGS. 1, 4C and 4D.

Juncture lines 115, 116 are parallel to each other. Each of tabs 113, 114 also has a curved slot 117, 118 in its respective edge 119, 120 opposite to and parallel with the respective edge 115, 116 defining the juncture line with the flexible portion 112. The curved slots 117, 118 cooperate to form a pin-receiving aperture 24 to axially grip the pin and to release it upon actuation of the release mechanism.

Typical and preferred dimensions of the locking spring for a T5 type bi-pin lamp end are 0.100 inches for the length of first portion 111; width of first portion 111 is 0.100 inches; length of fold is 0.180 inches; flexible portion 112, top to bottom is, for example 0.426 inches; width is, for example, 0.460 inches; slots 117, 118 are, for example, 0.07 inches in diameter and 0.30 inches from bottom and 0.74 inches from center of aperture to the side; tabs 113, 114 are, for example, 0.140 inches in width and 0.20 inches from juncture line 115 to juncture line 116. However, those skilled in the art will recognize that other dimensions may be used depending on the particular lamp and special requirements involved.

The connector also comprises a release member 22 adapted for axial movement within first housing section 12, preferably comprising a wedge-shaped, unitary member. Preferably wedge-shaped release member 22 comprises a first portion 26 adapted to engage a first portion 111 of locking spring 20 against first housing section 12 and second and third portions 23, rectangular in shape, having juncture lines with first portion 26.

Pressing of portions 16 and 29 of second housing section 11 moves first portion 26 axially against locking spring 20 to release the lamp pins from locking spring 20 simultaneously. The release member 22 acts to force the effective diameter or width of each pin-receiving aperture 24 to increase upon flexing of portions 16 and 29 of the second housing section 11 to release the pins of the fluorescent lamp from locking spring 20 simultaneously to allow the fluorescent lamp to be separated from the connector. Force applied to the locking spring 20 by the wedge 22 increases-the radius of curvature of flexible portions 112. This action releases the gripping force on the lamp pins and-permits the connector to be removed or installed.

The connector operates through transfer or force via inclined planes. Finger pressure applied by clasping the clamshell lever portion of second housing section 11 drives the internal release member 22 against locking spring 20. The clamshell lever portion of second housing section 11 transfers radial force exerted on release member 22 into the linear force required to move release member 22 against metal locking spring 20. The release member 22 is preferably formed with at least one, preferably two, rectangular formations or rails 23 which cooperate with a respective channel 25 formed in the first housing section 12. Preferably rails 23 are on either side of wedge-shaped release member 22 and guide the release member or wedge 22 through channels 25 in the bridge or first housing section 12 and into locking spring 20 upon flexing of second housing section 11.

The connector of the present invention is preferably designated to obviate the need for plastic welding. The plastic components snap together and remain firmly in place during normal operation.

In operation, to install the lamp connector onto a two pin fluorescent lamp, light finger pressure is applied to clamshell lever 11. The pin entry end of the connector is then axially pushed onto each pin 100 of a bi-pin fluorescent lamp 101 until it rests, as shown in FIG. 1, flush against the body of the lamp 101. The clamshell lever 11 is then released to cause locking spring 20 to engage and grip each fluorescent lamp pin 100.

To remove the connector from the fluorescent lamp, sufficient finger pressure is applied to the side portions 16, 29 to release the force on the lamp pins. This action moves the release member 22 axially against locking spring 20 and releases the mechanical gripping force of each pin-receiving aperture of locking spring 20 simultaneously. Prior to releasing pressure, the connector is withdrawn from the fluorescent lamp 101 until the lamp pins are extracted. Finger pressure is then released.

The quick release compact fluorescent lamp connector offers significantly greater lighting system mounting flexibility than conventional connector designs. A simple mechanical action is required to engage and disengage the connector from the lamp pins.

When properly seated on the lamp, the locking spring tabs 113 and 114 maintain sufficient force on the lamp pins to provide adequate electrical and mechanical contact even under adverse environmental conditions including vibration, shock, and temperature extremes. As opposed to more conventional designs, the connector of the present invention does not combine provisions for mechanically securing the lamp fixture or bulkhead with that of the electrical connection. Removing this requirement from the connector enables the connector to be significantly smaller and more compact increasing the lighting system flexibility by virtue of its small size and ease of operation.

Having described the invention in detail and by reference to the preferred embodiments thereof, it will be apparent that modifications and variations are possible without departing from the scope of the invention defined in the following claims.

I claim:

1. A fluorescent lamp connector for releasable axial engagement with a bi-pin fluorescent lamp comprising:
   (a) a first housing section having an open end and at least one wire-receiving recess through a surface of said first housing section;
   (b) a second housing section adapted to be connected to at least a portion of said first housing section;
   (c) a locking spring received within said open end of said first housing section comprising a plurality of pin-receiving apertures, each aperture adapted to axially receive and grip a pin of the fluorescent lamp, and to release said pin upon flexing of said locking spring, said locking spring being electrically connected to a fluorescent lamp power source; and
   (d) a wedge-shaped release member adapted for axial movement within said first housing section upon flexing of said second housing section, said release member causing said locking spring to release the pins from said locking spring simultaneously upon flexing of said second housing section to allow the fluorescent lamp to be separated from the connector;
   wherein said locking spring is formed as a unitary member comprising:
   (e) a first portion at least in part rectangular in shape and adapted to be electrically connected to an electrically conductive wire for electrical connection to a fluorescent lamp power source;
   (f) a flexible portion having a curved edge connected to said first portion; and
   (g) a plurality of metal tabs each being rectangular in shape and having a juncture line with said flexible portion, said juncture lines being parallel to each other, each of said tabs having a curved slot in the edge opposite to and parallel with the edge defining the juncture line with said flexible portion.

2. A lamp connector as in claim 1 wherein
   (a) said first housing section comprises a body of injection molded plastic and having at least one channel for receiving said release member and two pin-receiving openings for receiving the pins of a bi-pin fluorescent lamp; and
   (b) said second housing section comprises a clamshell lever fabricated with injection molded plastic having a back portion rectangular in shape and top and bottom portions perpendicular to said back portion, said back portion having two pin-receiving openings aligned with said pin-receiving openings of said first housing section.

3. A lamp connector as in claim 1 wherein
   (a) said locking spring is electrically connected to a fluorescent lamp power source by an electrically conductive wire; and
   (b) said second housing section comprises a clamshell lever fabricated with injection molded plastic having a back portion rectangular in shape and top and bottom portions, and configured to secure said release member and said locking spring within said first housing section.

4. A lamp connector as in claim 1 comprising:
   (a) a locking spring comprising a plurality of locking tabs of electrically conductive metal electrically connected to a fluorescent lamp power source by an electrically conductive wire attached to a tab at an edge of said spring;
   (b) one wire receiving recess for said wire extending through a back surface of said first housing section;
   said second housing comprising a clamshell lever fabricated with injection molded plastic having a back portion rectangular in shape and top and bottom portions perpendicular to said back portion, and configured to secure said release member and said locking spring within said first housing section.

5. A lamp connector as in claim 1 wherein
   (a) said first housing section comprises a body of injection molded plastic having two pin-receiving openings for receiving the pins of a bi-pin fluoresant lamp; and (b) said second housing section comprises a clamshell lever fabricated with injection molded plastic adapted to be snap-fitted to a back surface of said first housing section without welding, and having a back portion rectangular in shape and top and bottom portions, said back portion having two pin-receiving openings aligned with said pin-receiving openings of said first housing section.

6. A lamp connector as in claim 1 wherein (a) said first housing section comprises a body of injection molded plastic having at least two channels for receiving said release member, and (b) said release member has at least two rails which guide said release member through said channels in said first housing section and into said locking spring upon flexing of said second housing section.

7. A lamp connector as in claim 1 wherein said locking spring is welded to one electrically conductive wire for electrical connection to a fluorescent power source.

8. A lamp connector as in claim 1 wherein said release member comprises a wedge-shaped unitary member comprising:

(a) a first portion adapted to engage a portion of said locking spring against said first housing section; and (b) second and third portions rectangular in shape having juncture lines with said first portion, whereby pressing of the second housing section moves the first portion axially against said locking spring and releases the pins from said locking spring simultaneously.

9. A lamp connector as in claim 1 wherein said first housing section comprises a unitary body of insulating material containing a pair of circular recesses through said open end.

* * * * *